INVENTOR.
RONALD G. SCHULTZ

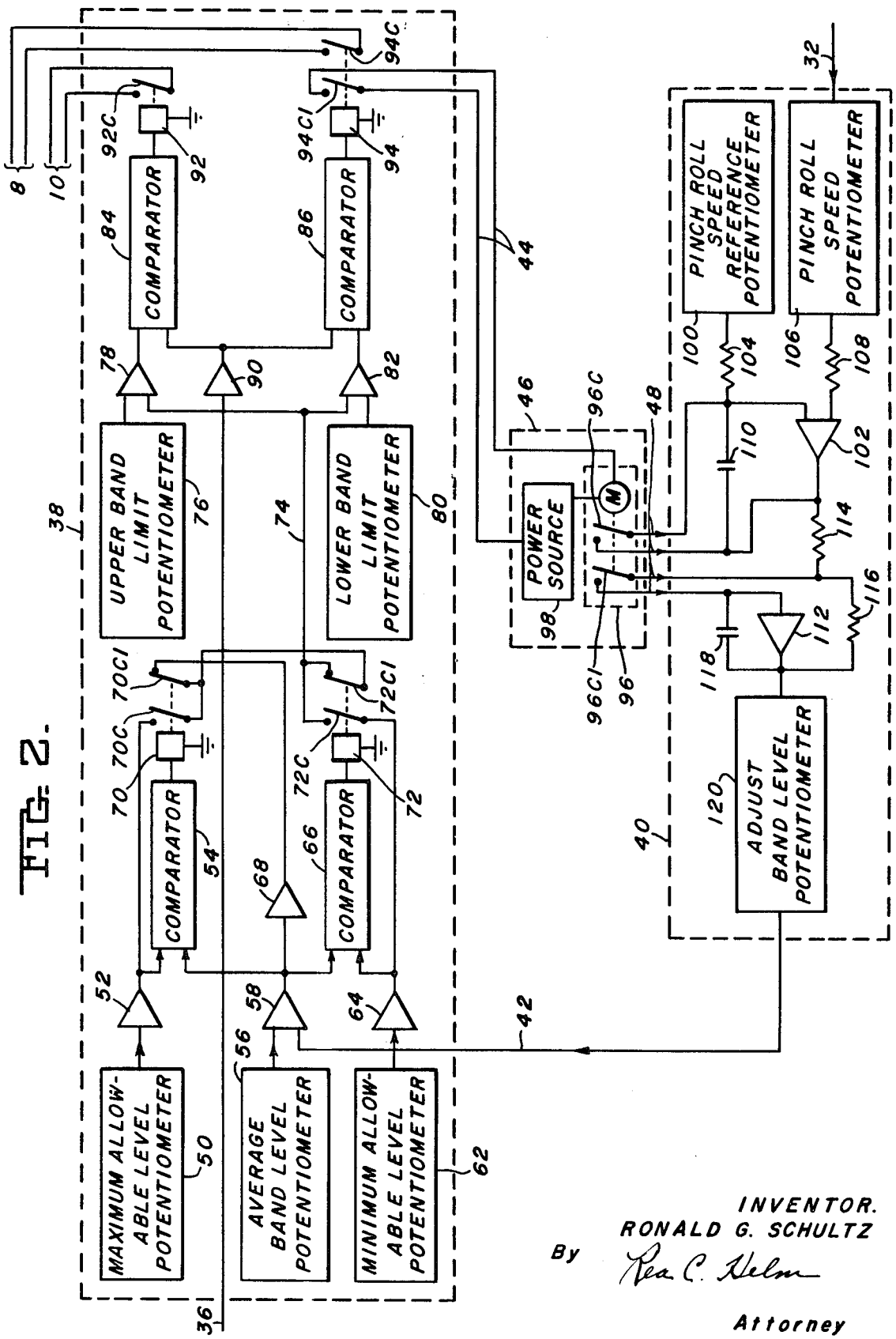

United States Patent Office 3,605,862
Patented Sept. 20, 1971

3,605,862
SYSTEM FOR FEEDBACK CONTROL OF MOLD
LEVEL IN A CONTINUOUS CASTING PROCESS
UTILIZING A POUR BOX
Ronald G. Schultz, Bay Village, Ohio, assignor to
United States Steel Corporation
Filed May 8, 1969, Ser. No. 823,097
Int. Cl. B22d 11/10, 17/32
U.S. Cl. 164—155                               10 Claims

ABSTRACT OF THE DISCLOSURE

A system for controlling the mold liquid level in a continuous casting process with a pour box and a degassing vessel between a hot metal ladle and the mold. The controller cycles the pour box level within a predetermined band by opening the ladle stopper when the liquid level reaches the lower limit and closing the ladle stopper when the liquid level reaches the upper limit. The level of the band is reset each cycle according to the amount of metal cast during the previous cycle.

---

Figure 1:
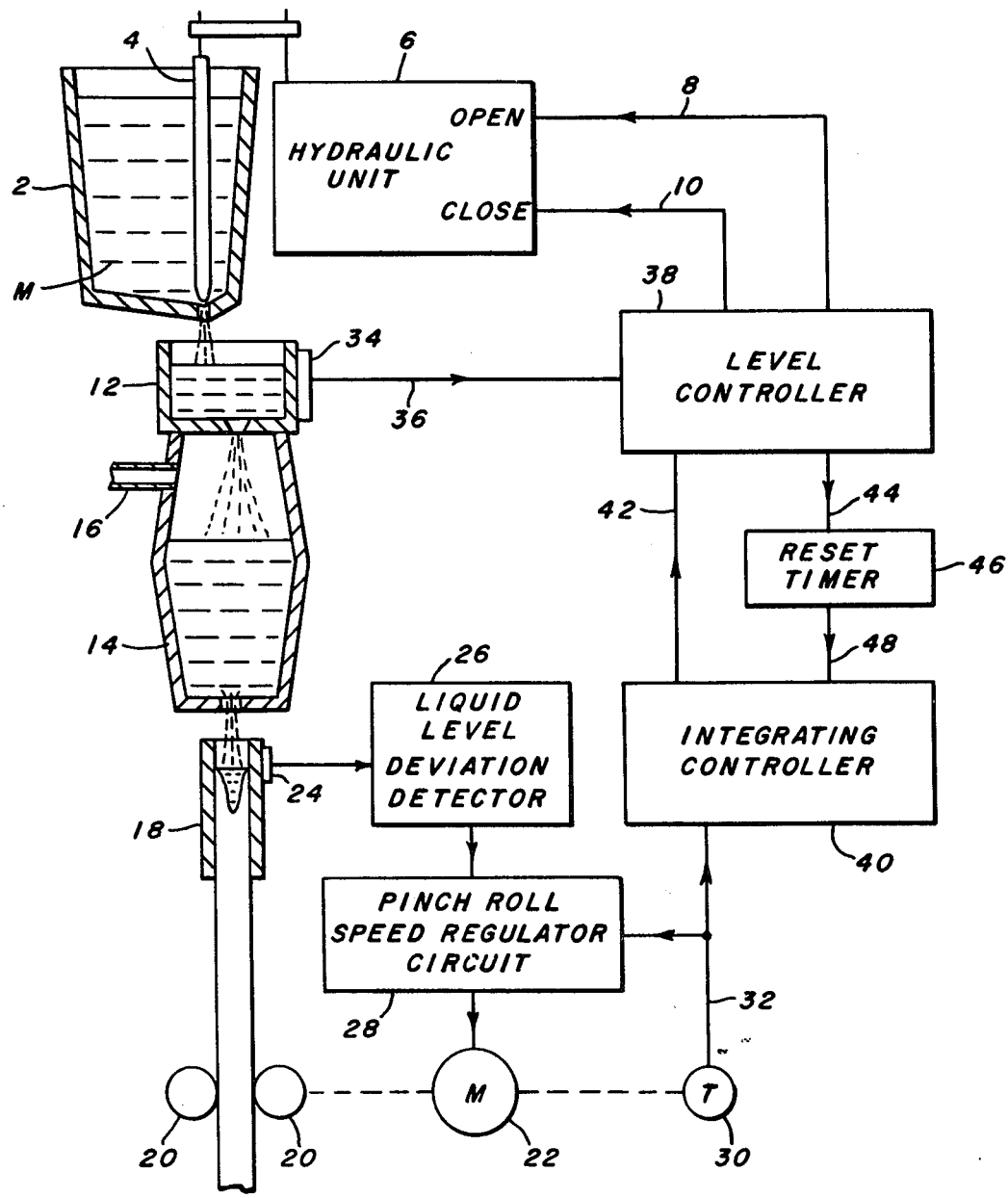

This invention relates to a system for controlling the mold liquid level in a continuous casting process and, more particularly, to a feedback control system for a continuous casting process which includes a pour box and a degassing vessel.

One system for controlling the mold liquid level in a continuous casting process is described in Tiskus et al. Pat. No. 3,300,820, dated Jan. 31, 1967. This system is designed for direct pouring, and the addition of a pour box and a degassing vessel introduces large time lags (inflow versus outflow) into the control system. This creates undesirable large mold level deviations caused by disturbances in the system such as nozzle freezing or erosion. The disturbances may even make the system so unstable as to require stopping the casting process.

According to my invention, the pour box level is continuously cycled within a band throughout the entire cast by opening the ladle stopper to full ON position until an upper band limit is reached and then closing the stopper to a full OFF position until a lower band limit is reached. The limits are determined by desired levels of liquid within the band. The band level is set by a feedback signal derived from the average casting speed of the prior cycle.

It is, therefore, an object of my invention to provide a control system for a continuous casting system having a pour box and degassing vessel.

Another object is to provide a cycling control system which is continuously adjusting.

A further object is to provide a system which eliminates long delays in control response.

A still further object is to provide a system which includes a feedback control from the mold withdrawal speed to the ladle stopper.

These and other objects will become apparent from the following specification and drawings, in which:

FIG. 1 is a schematic diagram of a casting system incorporating the invention; and FIG. 2 is a schematic diagram of the level controller, integrating controller and reset timer of my invention.

Referring now to the drawings, reference numeral 2 is a bottom pour ladle holding molten metal M. Flow of metal from the ladle is controlled by a stopper rod 4 which is positioned by a hydraulic unit 6 which raises the stopper when an "open" electrical signal 8 is received and lowers the stopper when a "close" electrical signal 10 is received. Molten metal M empties from ladle 2 when stopper 4 is raised into a pour box 12 and then into a degassing vessel 14. Vessel 14 has a conduit 16 connected to vacuum apparatus (not shown) to withdraw gas released during the pouring operation. Molten metal M flows out of vessel 14 into a mold 18 where it solidifies and is continuously withdrawn by pinch rolls 20 driven by a motor 22. A mold liquid level detector 24 is connected to a liquid level deviation circuit 26 which is connected to a pinch roll speed regulator circuit 28. Motor 22 also drives tachometer generator 30 to provide a casting speed signal 32 connected to circuit 28. Other means, such as optical speed measuring systems, may be used to obtain the signal 32 proportional to casting speed. The parts thus far described are conventional. Circuit 26 and circuit 28 may be the type described in the above identified Tiskus et al. patent, but without a dead span in the pinch roll speed regulator circuit 28.

A pour box level detector 34 provides a signal 36 to a level controller 38. Detector 34 may be a Capacitance Tundish Level Gage manufactured by the Brun Corporation, Columbus, Ohio. Load cells (not shown) supporting pour box 12 may be used in place of detector 34. Level controller 38 provides "open" signal 8 and "close" signal 10 to hydraulic unit 6 depending on the level of metal M in the pour box 12. Output 32 of tachometer generator 30 is also connected to an integrating controller 40 which provides an adjust band level signal 42 to level controller 38. Level controller 38 provides a timer signal 44 to a reset timer 46 which provides a reset signal 48 to integrating controller 40.

Level controller 38 includes a maximum allowable pour box level potentiometer 50 connected to an amplifier 52 which is connected to one input of a comparator 54. An average band level potentiometer 56 is connected to one input of a summing amplier 58. Output 42 from integrating controller 40 is connected to the other input of amplier 58. A minimum allowable pour box level potentiometer 62 is connected to the input of an amplifier 64. The output of amplifier 64 is connected to one input of a comparator 66. The output of amplifier 58 is connected to the second input of comparator 54, to the second input of comparator 66, and to the input of an amplifier 68. The output of comparator 54 is connected to a relay coil 70. The output of amplifier 52 is connected to a normally open contact 70C and the output of amplifier 68 is connected to a normally closed contact 70C1. The output of comparator 66 is connected to a relay coil 72. The output of amplifier 64 is connected to a normally open contact 72C. Contacts 70C and 70C1 are connected to a normally closed contact 72C1. Contacts 72C1 and 72C are connected to provide a cycle band level signal 74.

An upper pour box band limit potentiometer 76 is connected to one input to a summing amplifier 78 which has signal 74 connected to its second input. A lower pour box band limit potentiometer 80 is connected to one input of a summing amplifier 82 which has signal 74 connected to its second input. The output of amplifier 78 is connected to one input of a comparator 84. The output of amplifier 82 is connected to one input of a comparator 86. Signal 36 from level detector 34 is connected to the input of an amplifier 90. The output of amplifier 90 is connected to the second input of comparator 84 and the second input of comparator 86. The output of comparator 84 is connected to a relay coil 92 having a normally open contact 92C connected to activate "close" stopper circuit 10 in hydraulic unit 6. The output of comparator 86 is connected to a relay coil 94 having a first normally open contact 94C connected to activate "open" stopper circuit 8 in hydraulic unit 6 and a second normally open contact 94C1 connected to activate timer signal 44 by connecting a single cycle multi-cam timer 96 to a power source 98 in reset timer 46. The parts 96 and 98 make up reset timer 46 while the remaining parts of this paragraph make up level controller 38. Potentiometers 50, 56, 62, 76 and 80 are conventional potentiometers. Comparators 54, 66, 84 and 86 may each be a Model 19–501 comparator manufactured by Consolidated Electrodynamics, Bridgeport, Conn. Timer 96 may be a series RC single cycle multicam timer manufatured by the Industrial Timer Corporation, Parsippany, N.J.

Integrating controller 40 includes a pinch roll reference speed potentiometer 100 connected to an operational integrating amplifier 102 through a resistor 104. Output 32 of the pinch roll speed tachometer is connected to a pinch roll speed potentiometer 106. Potentiometer 106 is also connected to amplifier 102 through a resistor 108. A capacitor 110 is connected across amplifier 102. Normally open timer contact 96C is connected across capacitor 110. The output of amplifier 102 is connected to the input of an operational integrating amplifier 112 through a resistor 114 and a normally open contact 96C1 of timer 96. A resistor 116 is connected between resistor 114 and the output of amplifier 112. A capacitor 118 is connected across amplifier 112. The output of amplifier 112 is connected to an adjust band level potentiometer 120 which provides output 42 of integrating controller 40. Potentiometers 100, 106 and 120 are conventional potentiometers. Amplifiers 102 and 112 may each be Model 19–407 integrators manufactured by Consolidated Electrodynamics, Bridgeport, Conn. Resistors 104, 108, 114 and 116 and capacitors 110 and 118 match requirements of amplifiers 102 and 112. Resistor 114 should equal resistor 116 and the time constant of capacitor 118 and resistor 114 should be about 0.01.

In operation, potentiometer 100 is set by the operator to a voltage corresponding to the pinch roll reference speed which is the desired average casting speed. Potentiometer 106 is set to adjust output 32 from tachometer generator 30 to be compatible with potentiometer 100. Potentiometers 50, 56, 62, 76 and 80 are set by the operator prior to the start of a cast. Potentiometer 76 is set to the fixed amount or band the pour box level is to rise above the average band level during a cycle and potentiometer 80 is set to the fixed amount or band the pour box level is to fall below the average band level during a cycle. Potentiometer 56 is set to the average pour box band level desired at the beginning of the cast. Potentiometer 50 is set at the maximum cycle band level allowable during one cycle which is equal to the maximum liquid level allowable minus the fixed amount the level is to rise above the cycle band level in any one cycle. Potentiometer 62 is set to the minimum cycle band level allowable during one cycle which is equal to the minimum liquid level allowable in the pour box plus the fixed amount that the level is to fall below the cycle band level in any one cycle.

The difference between potentiometers 100 and 106 is integrated in amplifier 102. Once in each pour box cycle, comparator 86 has an output which causes contact 94C1 to close and activate timer 96 which goes through one cycle, turns off and turns on again the next time comparator 86 has an output. Timer 96 first closes contact 96C1 which transfers the output of amplifier 102 to amplifier 112 and charges capacitor 118. Contact 96C1 then opens, retaining the output across capacitor 118. Next, contact 96C closes which discharges capacitor 110 and resets the integrator 102 to zero. Contact 96C then opens and the integration begins for the next pour box cycle. Timer 96 completes its cycle in about 10 seconds, which is small compared to a pour box cycle of two to five minutes. The time constant of capacitor 118 and resistor 116 should be about 0.01 to match the characteristics of the various components in controller 40. Potentiometer 120 is set to adjust the amount of change in the output of amplifier 112 and thus adjust feedback gain to match the overall system.

Pinch roll speed variation is present throughout a cast. The magnitude of these variations is minimized by the action of integrating controller 40 which determines a band level that will maintain average casting speed constant. If the integration performed by integrator 102 over a pour box cycle is positive, indicating an average speed below the pinch roll speed reference 100, the adjust band level signal 42 for the next cycle rises. If the value of the integration of a pour box cycle is negative, indicating an average speed above the pinch roll speed reference 100, the adjust band level signal 42 for the next cycle lowers.

The outputs of potentiometers 120 and 56 are added in amplifier 58 to give the cycle band level signal for the next cycle. This output is compared to the maximum and minimum allowable levels. If greater than the maximum allowable level, the output of potentiometer 50 is connected to output 74. If less than the minimum allowable limit, the output of potentiometer 62 is connected to output 74. If the output of amplifier 58 is between these limits, the output of amplifier 58 is reversed in amplifier 68 and connected to output 74.

Signal 36 from level detector 34 is amplified by amplifier 90 to be compatible with other signals. Amplifier 78 adds the cycle band level for the next cycle, signal 74, and the fixed amount the pour box level is to rise above the cycle band level 74. Comparator 84 has an output when fier 90 to be compatible with other signals. Amplifier 78 closes relay contact 92C sending signal 10 to hydraulic unit 6, fully closing the ladle stopper 4. Amplifier 82 adds the cycle band level for the next cycle, signal 74, and the fixed amount by which the level can fall below the cycle band level 74. Comparator 86 has an output when the output of amplifier 82 exceeds the output of amplifier 90. This closes relay contact 94C sending signal 8 to hydraulic unit 6, opening ladle stopper 4. At the same time, relay contact 94C1 also closes beginning the reset cycle to integrating controller 40 which has already been described.

Thus the pour box level is continuously raised and lowered throughout the cast as the level controller 38 causes hydraulic unit 6 to open and close the ladle stopper 4. The amount of pour box level deviation above and below the desired average is set by the operator and remains fixed for a cast. The cycle band level is determined by summing the operator's average band level setting for the cast and the adjust band level signal as determined by the integrating controller 40.

While it has been shown that the integrating controller 40 is reset each time the ladle stopper 4 is opened, it is obvious that the controller could be reset each time the ladle stopper is closed, or each time the ladle stopper is opened or closed, or a combination thereof depending on liquid retention times and flow rates of the liquid through the system.

Although the control system is shown in a system with two intermediate vessels, a pour box and a degassing vessel, between the ladle and the mold, it is obvious that the control system would be used in the same manner with a single intermediate vessel, or any cascaded vessel system. For example, ladle 2 could empty directly into vessel 14 which would be equipped with means to produce a level signal 36.

While the embodiment described herein is the preferred embodiment of my invention, it will be apparent that other adaptations and modifications may be made.

I claim:

1. In apparatus for controlling the supply of a liquid to a continuous casting mold which includes a ladle, an intermediate vessel for furnishing liquid to the mold, a ladle stopper for controlling liquid flow from the ladle into the intermediate vessel, means responsive to the mold liquid level for changing casting speed, and means for providing a signal proportional to casting speed, the improvement comprising means responsive to the liquid level in said intermediate vessel for cycling the liquid level within a band during a cast by opening the ladle stopper when the liquid level reaches a lower band limit and for closing the ladle stopper when the liquid level reaches an upper band limit, and means responsive to the average speed of the cast emerging from the mold during a cycle for changing the level of the band for the next succeeding cycle.

2. Apparatus according to claim 1 in which the cycling means includes means for determining the liquid level in said vessel, a level controller responsive to the output of the level determining means for selectively providing a signal to open the ladle stopper and a signal to close the ladle stopper, and means responsive to the open signal for raising the ladle stopper, and responsive to the close signal for lowering the ladle stopper.

3. Apparatus according to claim 1 in which said means for changing the band level includes a first potentiometer for providing a signal representing a desired fixed casting speed, a first integrator for integrating the difference between the signal representing the desired fixed casting speed and the casting speed signal, a second integrator, and reset means responsive to a reset signal in each cycle for first transferring the output of the first integrator to the second integrator and retaining that output fixed until the next succeeding reset signal, then setting the first integrator to zero, and then beginning a new integration on the first integrator, whereby the output of the second integrator provides a signal for adjusting the band level.

4. Apparatus according to claim 3 which includes a second potentiometer in the circuit for providing the signal adjusting the band level to vary the feedback gain of the apparatus.

5. Apparatus according to claim 3 in which the cycling means includes means for determining the liquid level in said vessel, a level controller responsive to the output of the level determining means for selectively providing a signal to open the ladle stopper and a signal to close the ladle stopper, and means responsive to the open signal for raising the ladle stopper and responsive to the close signal for lowering the ladle stopper.

6. Apparatus according to claim 5 which includes a second potentiometer in the circuit for providing the signal adjusting the band level to vary the feedback gain of the apparatus.

7. Apparatus according to claim 6 which includes a third potentiometer for providing a signal representing the desired average band level at the beginning of a cast, and a first summing amplifier in said level controller for adding the signal for adjusting the band level to the signal representing the desired average band level at the beginning of a cast thereby providing a cycle band level signal.

8. Apparatus according to claim 7 in which the level controller includes a fourth potentiometer for providing a signal representing a desired upper band limit, a second summing amplifier for adding the cycle band level signal to the signal representing the desired upper band limit, a fifth potentiometer for providing a signal representing a desired lower band limit, a third summing amplifier for adding the cycle band level signal to the signal representing the desired lower band limit, a first comparator means for providing the close ladle stopper signal when the output of the second summing amplifier is smaller than the output of the level determining means, a second comparator means for providing the open ladle stopper signal when the output of the third summing amplifier is smaller than the output of the level determining means, and means responsive to selected ladle stopper signals for providing said reset signal.

9. Apparatus according to claim 8 including a sixth potentiometer for providing a signal representing a maximum allowable liquid level in the intermediate vessel, a seventh potentiometer for providing a signal representing a minimum allowable liquid level in the intermediate vessel, and means for limiting said cycle band level signal between the signal representing the maximum allowable liquid level and the signal representing the minimum allowable liquid level.

10. Apparatus according to claim 9 in which said liquid is molten steel, said means for providing a signal proportional to casting speed includes pinch rolls for withdrawing the cast from the mold and a tachometer generator connected to the pinch rolls, and said intermediate vessel is a pour box, and which includes a vacuum degassing chamber through which the molten steel flows between the pour box and the mold.

References Cited
UNITED STATES PATENTS

| | | | |
|---|---|---|---|
| 3,480,073 | 11/1969 | Wilson | 164—155 |
| 3,521,696 | 7/1970 | Lowman et al. | 164—154 |

ROBERT D. BALDWIN, Primary Examiner

U.S. Cl. X.R.

164—254, 281